United States Patent [19]

McNally et al.

[11] Patent Number: 4,564,918

[45] Date of Patent: Jan. 14, 1986

[54] METHOD AND APPARATUS FOR MEASURING THE TIME DIFFERENCE BETWEEN TWO SAMPLING TIMES

[75] Inventors: Guy W. W. McNally, Shere, England; Roger Lagadec; Daniele P. C. Pelloni, both of Zurich, Switzerland

[73] Assignee: Willi Studer AG, Switzerland

[21] Appl. No.: 459,972

[22] Filed: Jan. 21, 1983

[30] Foreign Application Priority Data

Jan. 26, 1982 [CH] Switzerland ............... 476/82

[51] Int. Cl.⁴ ............................................. G04F 10/00
[52] U.S. Cl. ..................................... 364/569; 377/20; 364/575
[58] Field of Search ................ 364/569, 575, 734; 377/20; 375/95, 110, 25

[56] References Cited

U.S. PATENT DOCUMENTS

| | | | |
|---|---|---|---|
| 3,611,298 | 10/1971 | Jacobson | 375/95 |
| 3,761,818 | 9/1973 | Tazaki et al. | 375/95 X |
| 3,809,874 | 5/1974 | Pozzetti et al. | 364/575 X |
| 4,085,287 | 4/1978 | Kullmann et al. | 375/95 X |
| 4,199,817 | 4/1980 | Conkling et al. | 364/575 X |
| 4,458,206 | 7/1984 | Dellande et al. | 375/110 X |

OTHER PUBLICATIONS

A Universal, Digital Sampling Frequecy Converter for Digital Audio, Lagadec et al., 1981 IEEE, CH1610-5/81/0000-0595, pp. 595-598.

Primary Examiner—Edward J. Wise
Attorney, Agent, or Firm—Roylance, Abrams, Berdo & Goodman

[57] ABSTRACT

Equidistant timing pulses are counted during the time between the arrival of a first pulse edge of a first signal sequence and the arrival of a following second pulse edge of another signal sequence and are averaged to a mean value with equidistant timing pulses of an immediately preceding count between two pulse edges of the two signal sequences. The continuously formed mean values are accumulated with mean values of preceding cycles and in each case the least significant bit is further processed.

22 Claims, 6 Drawing Figures

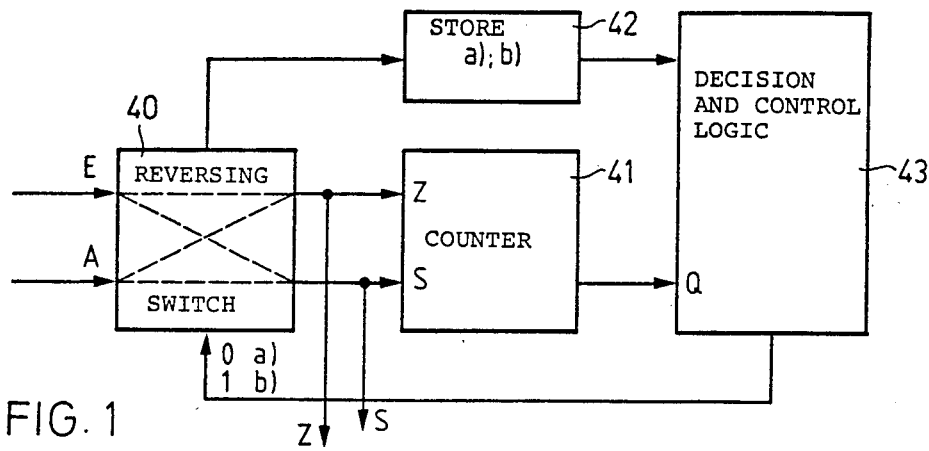
FIG. 1
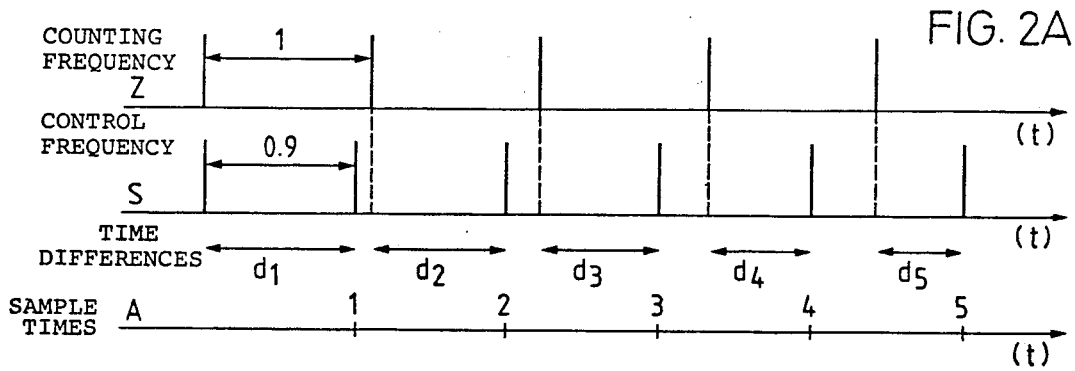
FIG. 2A
| SAMPLING TIMES | OUTPUT AVERAGING | OUTPUT STORE | TIME DIFFERENCE |
|---|---|---|---|
| 1 | 0.9 | 0 | $0.9 = d_1$ |
| 2 | 0.9 | 0.9 | $0.8 = d_2$ |
| 3 | 0.9 | 0.8 | $0.7 = d_3$ |
| 4 | 0.9 | 0.7 | $0.6 = d_4$ |
| 5 | 0.9 | 0.6 | $0.5 = d_5$ |
d1 = 0.9   d2 = 0.8   d3 = 0.7   d4 = 0.6   d5 = 0.5
FIG. 2B

METHOD AND APPARATUS FOR MEASURING THE TIME DIFFERENCE BETWEEN TWO SAMPLING TIMES

BACKGROUND OF THE INVENTION

When one wishes to measure the time difference between the sampling times of two signals, such as, for example, the sampling time of an input signal as compared with the sampling time of an output signal, the problem of making this measurement is conventionally solved by using a counter circuit in which the timing signal for the counter is derived from the sampling rate of the input signal and the start/stop instruction signals for the counter, and the readout of the counter content is determined by a timing signal which is a function of the sampling times of the output signal. A sampling rate converter of this type requires rather costly circuitry for this purpose because the timing pulse rates of such a counter circuit are very high as a result of the desired signal quality. If, for example, frequencies to be converted are approximately 50 kHz and if the signal quality is to correspond to that of a 16-bit format, then the necessary timing or clock pulse rate is approximately 1.6 GHz. It will be recognized that such rapidly operating circuits can only be constructed from correspondingly high quality components and, even then, there are serious restrictions on the circuit designs which can be used.

BRIEF DESCRIPTION OF THE INVENTION

An object of the present invention is to provide a method for measuring the time difference between two clock times of two sampled signals, particularly in connection with a sample rate converter, which measurement corresponds to the signal quality of a 16-bit format and, at the same time, can be constructed with easily obtainable integrated circuits operating at normal speed. Thus, there is no need to use particularly rapid circuitry which, at this time, belongs to technology of the future.

A further object is to provide a method which can accomplish such measurement under either of the following conditions: (1) one frequency, e.g., the input sampling frequency, is equal to or less than the other frequency, e.g. the output sampling frequency; or (2) one frequency (e.g. the input frequency) is larger than the other sampling frequency.

A further object of the invention is to provide a method which provides the correct time difference measurement, even for time-variable sampling frequencies. This means that the method is to be usable for a random frequency variation of the two frequencies.

Further, an object of the invention is to provide circuit apparatus for accomplishing the method of the invention.

Briefly described, the invention includes a method for measuring the time difference between sampling points of two sampled signals comprising the steps of providing a sequence of equally spaced clock pulses having a frequency derived from the frequency of the pulse edges of a first one of two sampled signal, counting said clock pulses between the arrivals of successive pulse edges of a second one of the two sampled signals averaging the number of clock pulses counted during the periods between two successive arrivals to give the actual mean value of a control cycle, and accumulating the actual mean values of control cycles.

In another aspect, the invention includes an apparatus for measuring the time difference between sampling points of two sampled signals comprising reversing switch means for receiving the two signals being sampled and for providing at a first output one of the signals having a frequency to be employed as a control frequency and at a second output the other to be employed as a counting frequency, a source of clock pulses, counter circuit means for counting clock pulses between selected pulses of the control and counting frequency signals, circuit means for averaging the counts in successive counting cycles, and an accumulator circuit for storing the results of the averaging.

BRIEF DESCRIPTION OF THE DRAWINGS

In order that the manner in which the foregoing and other objects are attained in accordance with the invention can be understood in detail, particularly advantageous embodiments thereof will be described with reference to the accompanying drawings, which form a part of this specification, and wherein:

FIG. 1 is a schematic circuit diagram, in block form, of a portion of the circuit arrangement in accordance with the invention for determining the counting frequency and control frequency as a function of the input and output sampling frequencies;

FIG. 2A is a time graph useful in explaining the concept of time difference as that concept is involved in the present invention;

FIG. 2B is a table usable in conjunction with FIG. 2A and FIG. 3;

DETAILED DESCRIPTION OF PREFERRED EMBODIMENTS

Figure 3:
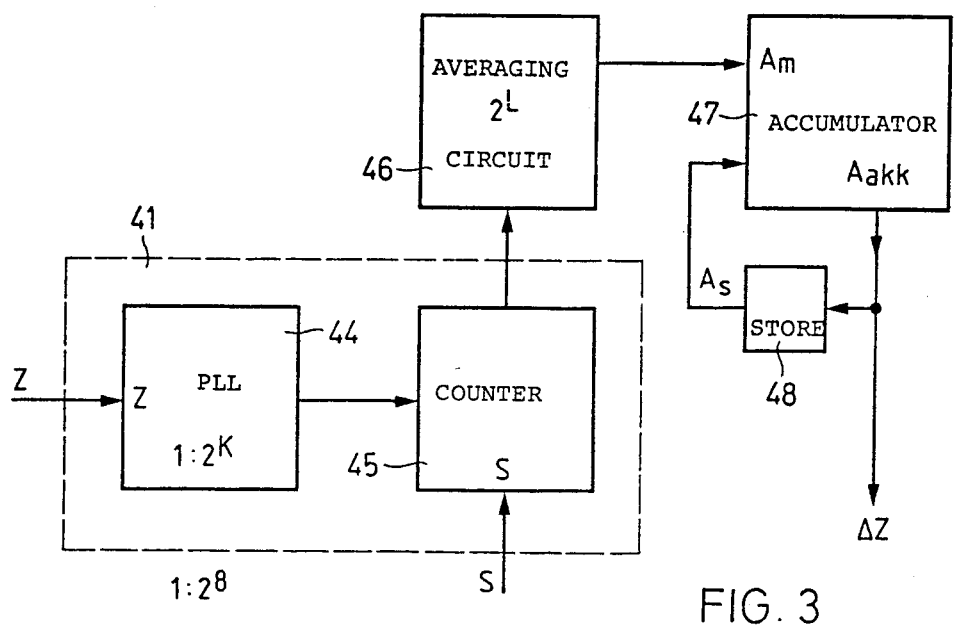
FIG. 3 is a schematic circuit diagram, in block form, of another portion of a circuit arrangement for performing the time measurement.

Before going into a discussion of the invention in detail, some background remarks may be helpful. The standard method for measuring a time difference in an apparatus of the type involving, for example, a sampling rate converter, consists of counting clock pulses between one edge of a pulse in an input signal and the correlated edge of a pulse in the output signal. The more accurate the time measurement required, the shorter must be the counting or clock pulses and the higher must be the rate at which they are supplied between the two pulse edges which are being used for the measurement. Thus, the higher the frequency of the counting pulses, the higher must be the counting frequency capability of the counter. If particularly rigorous demands are made on resolution, the counting frequency, when determined by conventional circuitry, reaches values which create problems.

The basic concept of the present invention is to perform the time measurement between one edge of the input signal and one edge of the output signal with relatively limited resolution, the result subsequently being improved by averaging with the aid of values of subsequent clock time measurements. Although this increases the measuring time, that increase is within usable limits, and the precision of the measurement is increased out of proportion to the effort and expenditure. For example, when using a slow counter compared with the conventional method and having a limited resolution of, for example, $2^K$ states, but where averaging takes place over several cycles, e.g. $2^L$ cycles, the same precision is obtained as if a very rapid counter with $2^{L+K}$ states had been used, but in which there was no averaging employed after the measurement. It is relatively easy to show this connection. For performing this process, the mean value must be substantially recalculated on a regular basis, i.e., after each cycle, or for each output time. The subsequent formation of the constant actual mean value also forms part of the process disclosed herein.

FIG. 1 shows in a block diagram form how it is possible to deal in a unitary manner with all of the possible ratios of input sampling rates to output sampling rates, as well as the case of time-variable sampling rates, by introducing the subsequently explained terms "counting frequency" and "control frequency". In simplified form, the block diagram has four essential components for correspondingly producing the control frequency and counting frequency. These four components are a reversing switch 40, a counter circuit 41, a temporary storage circuit 42 and a decision logic unit 43. The counter circuit 41 is composed of a phase locked loop (PLL) and a counter as specified for circuit 41, FIG. 3. Decision logic 43 controls the reversing switch 40, shown in a highly simplified schematic form, into which are fed the input sampling frequency signal E and the output sampling frequency signal A. At the output of the reversing switch is then available the control frequency and the counting frequency. Reversing switch 40 is advantageously constructed using a two-on-one multiplexer and, consequently, one of the signals at one of the input and output sampling frequencies delivered to switch 40 is chosen as the counting frequency and the other is designated as the control frequency. The switch is changed so that these frequencies appear at its outputs. The position of the reversing switch is determined by the actual sampling frequencies which are directly read out at the inputs of counter circuit 41 in parallel form as well as in the preceding switching state of switch 40, stored in storage unit 42. Decision logic 43 insures that the correct reversing switch position is used as a function of the existing data.

Without going into the details of the decision logic, it will be recognized that it is necessary to deal, for example, with the following cases which must be recognized and correspondingly converted:

(a) the input sampling frequency is always significantly higher than the output sampling frequency, in which case the control frequency is identical to the input sampling frequency and the counting frequency is identical to the output sampling frequency by a clearly defined relationship.

(b) the input sampling frequency is always lower than the output sampling frequency, in which case the control frequency is identical to the output sampling frequency and the counting frequency is identical to the input sampling frequency by a defined relationship.

In the case of time constant sampling rates, the counting frequency is always lower than the control frequency. Thus, in the circuit position of FIG. 1, there is an input data-dependent decision as to which of the input and output sampling frequencies will function as control or counting frequencies.

FIG. 2A illustrates the definition of the concept of time difference which is the time spacing between the leading edge of the actual counter signal pulse and the leading edge of the first control signal pulse occurring immediately after the actual counter signal edge. The time difference is defined as a function of the counting frequency for which purpose a two-power number is associated with the counting cycle. The time difference is represented as an integral fraction of this number. Thus, as can be seen in FIG. 2A, on the top time axis is plotted the counting frequency Z with a predetermined counting pulse spacing which is indicated as being unity for reasons of simplicity, and on the second time axis is plotted the control frequency S with a pulse spacing smaller than the pulse spacing of the counting frequency. It is emphasized that, in the case of constant time sampling rates, the counting frequency must be lower than the control frequency. The sampling times 1, 2, 3, etc. are plotted on the bottom time axis.

The corresponding time differences $d_1$, $d_2$, $d_3$... etc. are plotted above the bottom time axis with reference to the counting frequency and corresponding to the sampling time. The time difference process is again shown in tabular form in the table of FIG. 2B wherein the sampling times 1, 2, . . . 5 correspond to those of the bottom time axis in FIG. 2A. The starting values for averaging, which appear in the second column of the table, again considering the case of constant-time sampling rates, correspond in each case to 90% of the control frequency pulse spacing at the control frequency, related to the pulse spacing 1 of the counting frequency. The two next columns relate to data, discussed in connection with the circuit of FIG. 3, but it will be clear from the numerical values plotted therein that they must be identical with the desired time differences $d_1$ to $d_5$.

FIG. 3 is a block diagram of the essential functional components for measuring the time difference between one edge of the input signal and one edge of the output signal. These basic components comprise a phase locked loop PLL 44 as well as a series-connected counter circuit 45. These two circuit units, taken together, form a counter circuit equivalent to circuit 41 of FIG. 1. The two inputs Z and S are provided for the counting frequency and the control frequency, respectively. The output of the counter circuit leads to a circuit 46 for averaging over the $2^L$ values from the measured value for the actual control cycle and, via the output, the data for the actual mean value of the control cycle are supplied to an accumulator circuit 47. A loop connection of store 48 is associated with accumulator 47. The counting frequency is increased by a factor of $2^K$, e.g., 1:$2^8$ or $\frac{1}{2}^8$ with the aid of a PLL circuit 44. The counting cycle is related to this factor and serves to represent the time differences in binary form and as shown in FIG. 2A. The rapid sampling sequence, thus obtained, is applied to the clock or timing input of counter circuit 45. Circuit 45, which forms part of the counter circuit 41, now counts only until an edge of the control signal appears at the start/stop input. At this time, the count is supplied to the arithmetic averaging circuit 46 and the counter is simultaneously reset. After each edge of the control signal the substantially new mean value, having the duration of a control cycle or a period, appears in binary form at the output of the averaging circuit. This mean value, together with the preceding value of the time difference, is supplied to accumulator 47 at the output of which appears the desired time difference. The result of the time difference is also supplied, once again, to store 48 so that this value can be used for calculating the new time difference when measuring at the following control edge. An overflow of the accumulator is unimportant because the system only takes account of the (K+L) bits of the least significance for the time difference. In this relationship, $2^L$ is the number of cycles over which averaging takes place and $2^K$ is the increase factor of the scanning rate by PLL 44. The initial phase during the measurment of that time difference is also unimportant so that store 48 is always initialized with the value "0".

In connection with FIG. 3, reference is again made to FIG. 2B in which the time difference formation is represented in four columns. It is assumed, for example, that the counting frequency and the control frequency are time constant and are in a ratio of 9:10. Although the digital circuit operates with binary counts, the calculating method is demonstrated with figures in the decimal system which is easier for most of us to comprehend but which changes nothing in connection with the principle.

The calculation is performed by accumulator 47 and store 48 of FIG. 3. As the scanning frequencies here are constant, the averaging unit 46 always supplies the same value 0.9 as will be gathered from the second column of the table. Store 48 is initialized in an arbitrary fashion with the value 0, the addition of a constant during time-difference formation being unimportant and merely corresponding to a constant delay of the control signal relative to the counting signal. In the final column of the table in FIG. 2B, the time difference is shown as being represented by the least significant bit (LSB). The most significant bit (MSB) is not used as indicated by a symbolic deletion. The penultimate column shows the initial value of store 48 in which appears the preceding value, always displaced by one sampling point with respect to the actual time difference values. Thus, the sought time differences in this example are: $d_1=0.9$, $d_2=0.8$, $d_3=0.7$, $d_4=0.6$ and $d_5=0.5$.

Figure 4:
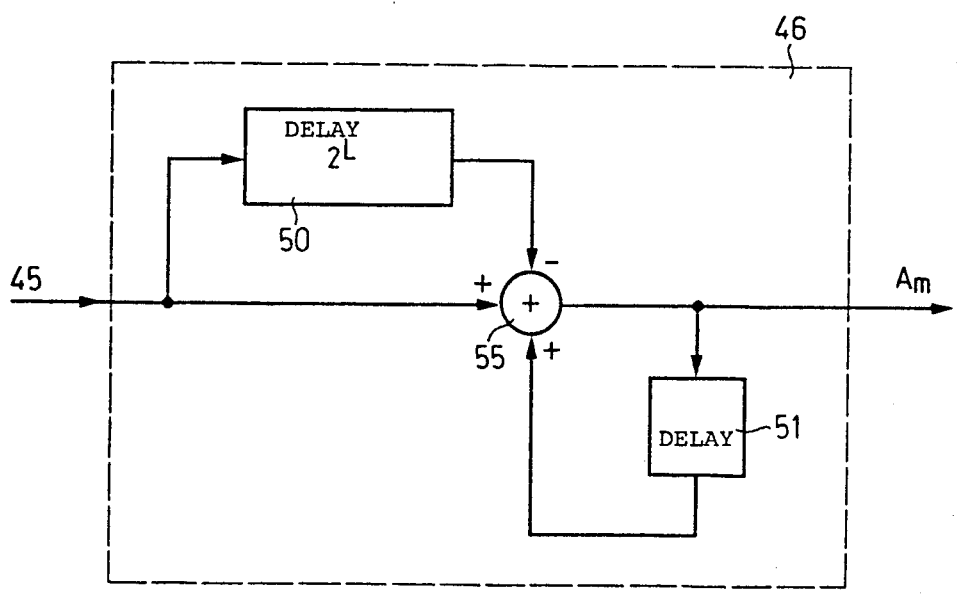
FIG. 4 is a circuit diagram, in block form, of a circuit for averaging measured control cycles.

FIG. 4 shows the circuit components of circuit 46 in more detail, still in a block form, this circuit being for averaging of the measured control cycles. The preceding input word delayed by $2^L$ sampling values is subtracted from the K-bit-long input word. The output results determined in the preceding control cycle are added to the intermediate result. The result of this addition represents the actual averaged output result as supplied to accumulator 47 in FIG. 3 and as represented by (L+K) bits. It is necessary to wait for $2^L$ sampling values until this circuit has built up an appropriate value. This delay is obtained by a delay line 50 which produces a time average spacing. The output of delay line 50 is arithmetically inverted and can be viewed as having a negative sign and is connected to an addition node which receives, at an input with a positive sign, the signals for the actual control cycle from counter circuit 45. A further delay line 51 delays the actual mean value by one sampling value which, in fact, results in the preceding mean value supplied to the addition node 55 with a positive sign. In order to determine the time difference with a precision of, for example, $2^{-15}$, with sampling frequencies of approximately 50 kHz, the counting frequency can be increased by 256, i.e. k=8, with the aid of PLL 44. Averaging can subsequently take place over 128 sampled values, i.e, L=7. The counter circuit counts up to 512 and the accumulator has 16 bits. The control cycle lasts about 20 microseconds and the attainable accuracy is approximately 300 picoseconds. As illustrated by this example, the unimportant delay in connection with the measurement of the first time difference is 2.56 milliseconds.

Figure 5:
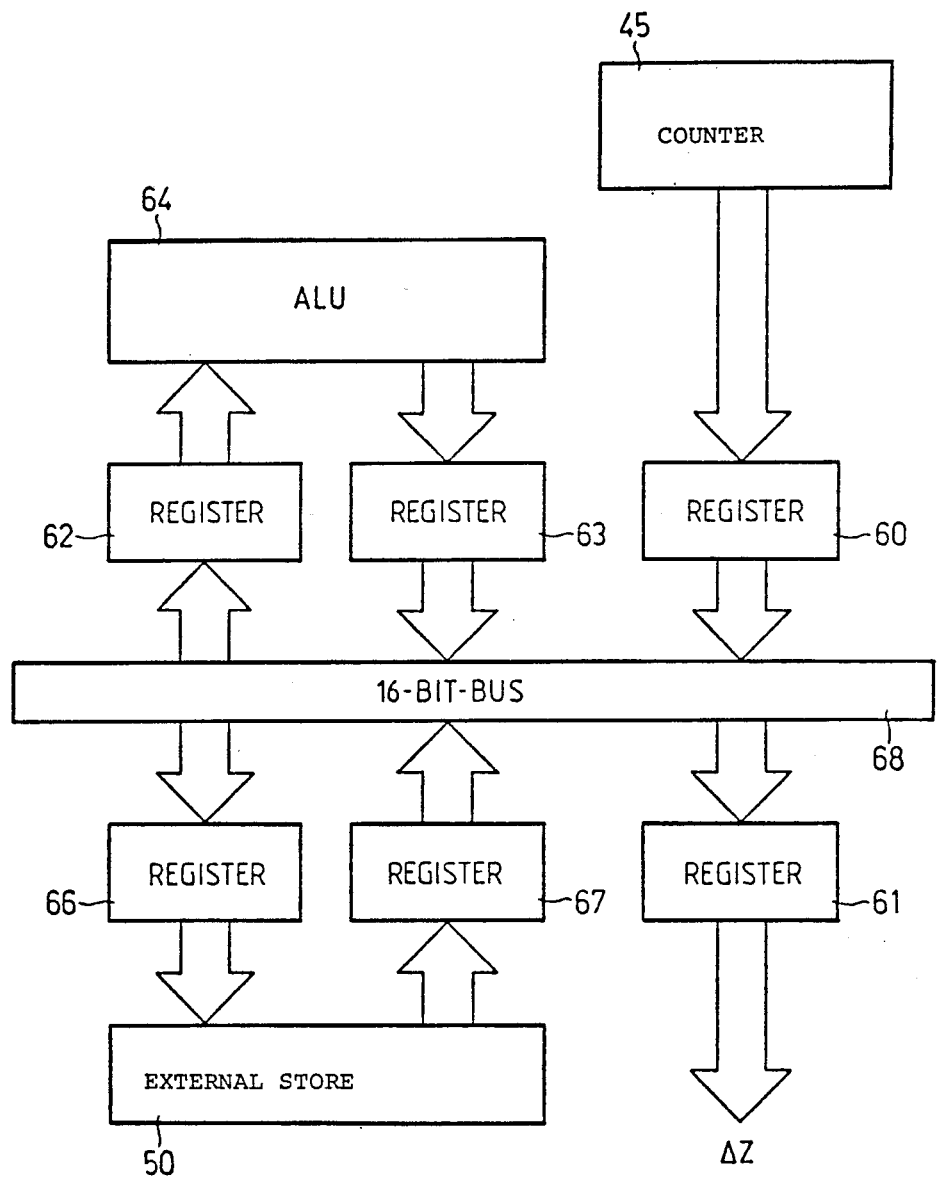
FIG. 5 is a schematic diagram, in block form, of a system for performing arithmetic operations in connection with averaging and accumulation.

FIG. 5 shows in detail an example of how the arithmetic averaging and accumulation operations can be performed. It relates to averaging unit 46 and accumulator unit 47. All of the operations are performed with the aid of a commercially available arithmetic logic unit (ALU), for which purpose a bus structure is used for data transmission.

The data from counter circuit 45 pass through register 60 to the 16-bit bus 68. The sought time difference appears at the output of register 61 which is also connected to the 16-bit bus. ALU 64 is also connected to the bus through registers 62 and 63 and sequentially performs the necessary arithmetic operations in accordance with a microprogram. The delay line 50 in averaging unit 46 is realized with an external store 50 and not the simple ALU 64. Store 50 is connected to the 16-bit bus 68 by registers 66 and 67.

The process described above for measuring the time difference between sampling times of two sampled signals is suitable for all applications in which a reference of a time-dependent quantity of the aforementioned type to be measured is used as a basis. Thus, for example, digital speed control can be performed.

When comparing more than two signal sequences, a first comparison result of two signal sequences is compared with a third signal sequence as a reference and the time difference between the two is measured. In the same way, it is possible to compare further signal sequences either in permutated form or in the desired order.

While certain advantageous embodiments have been chosen to illustrate the invention it will be understood by those skilled in the art that various changes and modifications can be made therein without departing from the scope of the invention as defined in the appended claims.

What is claimed is:

1. A method for measuring the time difference between sampling points of two sampled signals comprising the steps of generating a sequence of equally spaced clock pulses, counting said equally spaced clock pulses between the arrivals of first pulse edges in the first signal and the arrival of second pulse edges in the second signal, averaging the number of clock pulses counted during the periods between two successive arrivals to give the actual mean value of a control cycle, and accumulating the actual mean values of control cycles.

2. A method according to claim 1, wherein the method is used for measuring the time difference between the input and output sampling times of a sample rate converter, and including the steps of employing one of the frequency of the input sampling and the frequency of the output sampling as a processing control frequency and the other thereof as a processing counting frequency, and increasing the counting frequency as a function of the result of the employment of said frequencies.

3. A method according to claim 2 wherein the higher of the input and output sampling frequencies is used as said processing control frequency.

4. A method according to claim 1 wherein the first and second pulse edges are in first and second sampling signals, respectively, one of the signals being employed as a counting frequency signal and the other as a control frequency signal.

5. A method according to claim 4 and including
increasing the counting frequency by $2^K$,
delaying the actual control cycle by $2^L$ sampling interval,
delaying of the actual means value by 1 sampling interval,
summing the actual control interval with the inverse of the control interval delayed by $2^L$ sampling periods and with the mean value delayed by one sampling interval,
accumulating the actual mean values to the (K+L) bit, and
separating the least significant bit from the (K+L) bit for further processing.

6. An apparatus for measuring the time difference between sampling points of two sampled signals comprising
reversing switch means for receiving the two signals being sampled and for providing at a first output one of the signals having a frequency to be employed as a control frequency and at a second output the other signal having a frequency to be employed as a counting frequency;
a source of clock pulses;
counter circuit means for counting clock pulses between selected pulses of the control and counting frequency signals;
circuit means for averaging the counts in successive counting cycles; and
an accumulator circuit for storing the results of the averaging.

7. An apparatus according to claim 6, wherein said counter circuit means includes a phase locked loop and a counter.

8. An apparatus according to claim 7, wherein said accumulator circuit includes a storage circuit on the output side in a loop connection.

9. An apparatus according to claim 8 wherein said said averaging circuit mean comprises a first delay line and a second delay line and an addition node, and circuit means for supplying to said node the outputs of the two delay lines and the output of the counter circuit means.

10. A circuit arrangement according to claim 9 wherein said reversing switch means includes a logic circuit and a store for storing the switchover data.

11. A method for measuring the time difference between pulse edges of a first and second signal, each composed of a sequence of pulses, comprising the steps of
providing a sequence of equally spaced clock pulses, said clock pulses having a frequency which is substantially higher than the frequency of the pulse edges of said first and second signal and which is derived from the frequency of the pulse edges of the first signal,
counting clock pulses between the arrivals of successive pulse edges of the second signal, said successive pulse edges defining a period,
averaging the number of clock pulses counted during a plurality of periods to give an actual mean value,
accumulating two successive actual means values, and
subtracting an overflow from the accumulated actual mean values.

12. A method according to claim 11, and using the method for measuring the time difference between pulse edges of input and output signals of a sampling rate converter, whereby the pulse edges define sampling points of sampled signals, and including the steps of
employing the frequency of the pulse edges of one of the input signal and the output signal as a processing control frequency and employing the other thereof as a processing counting frequency, and
increasing the processing counting frequency up to a clock frequency of said clock pulses.

13. A method according to claim 12, wherein the frequency of the one of the input and the output signals with the higher frequency is used as the processing control frequency, and
said processing control frequency starting and stopping the counting of clock pulses.

14. A method according to claim 11, wherein the pulse edges of the first and second signal are defining sampling points of respective first and second sampled signals and wherein one of the signals is employed as a counting frequency signal and the other as a control frequency signal.

15. A method according to claim 14, and including
increasing the frequency of the counting frequency signal by $2^k$,
delaying the result of the counting of clock pulses during an actual period by a number of time intervals each corresponding to the interval between two successive sampling points of one of the sampled signals, said number of time intervals being $2^L$,
delaying the actual mean value by a time interval corresponding to the interval between two successive sampling points of one of the sampled signals,
summing of the result of the counting during the actual period with the inverse of the delayed result of the counting by $2^L$ intervals and with the mean value delayed by one of said intervals, and
accumulating two successive mean values to an accuracy of (K+L) bit, and separating the least significant bits from the acculumated (K+L) bits for further processing.

16. A method according to claim 11, comprising the steps of comparing the frequency of the pulse edges of the first and the second signal, and
taking the signal with the lower frequency as the first signal and taking the signal with the higher frequency as the second signal.

17. A method according to claim 11, wherein said averaging is performed by correcting a previously computed mean value by numbers of clock pulses counted during an old period and an actual period.

18. An apparatus for measuring the time difference between pulse edges of a first and a second signal composed of sequences of pulses comprising
reversing switch means for receiving the first and the second signal,
said reversing switch means comprising a first output for one of the signals and a second output for the other signal,
a source of clock pulses,
counter circuit means for counting clock pulses between pulse edges of the first or the second signal,
circuit means for computing mean values of counted clock pulses from a plurality of counted clock pulses, and an accumulator circuit for accumulating computed mean values.

19. An apparatus according to claim 18, wherein said counter circuit means includes a phase locked loop and a counter.

20. An apparatus according to claim 18, wherein said accumulator circuit includes a storage circuit connected on the output side in a loop connection.

21. An apparatus according to claim 18, wherein said circuit means for computing mean values comprises a first delay line and a second delay line and an addition node, and circuit means for supplying to said node the outputs of the two delay lines and the output of the counter circuit means.

22. An apparatus according to claim 18, wherein said reversing switch means includes a logic circuit and a store for storing data relating to the state of the switch means.

* * * * *